United States Patent Office 3,686,017
Patented Aug. 22, 1972

3,686,017
SURFACE TREATMENT OF NYLON SHAPED ARTICLES WITH AQUEOUS REDUCING AGENTS
Virginia C. Menikheim, Chapel Hill, and Charlie C. Kilmer, Raleigh, N.C., assignors to Monsanto Co., St. Louis, Mo.
No Drawing. Filed Oct. 5, 1970, Ser. No. 78,299
Int. Cl. C23b 5/64; C23c 3/02
U.S. Cl. 117—47 A        6 Claims

ABSTRACT OF THE DISCLOSURE

Shaped nylon (i.e. polyamide) articles having greatly improved surface characteristics are provided by a process which involves ionization of the surface amide groups by a brief exposure to aqueous solutions of reducing acids under carefully controlled conditions, followed by washing and drying the surface. The nylon articles so produced are excellently suited for coating with metal plate or polar organic resins.

BACKGROUND OF THE INVENTION

(1) Field of the art

This invention relates to polyamide, i.e. nylon, articles having greatly improved capability of being permanently plated or coated with metals or organic polymers, and to the method of producing such articles.

(2) Prior art

Metal plated plastic products are known to possess combinations of desirable properties not available in products made from either the plastic or the metal alone. Plastics have a larger design latitude than metals; consequently, products with more intricate detail can be fabricated economically. The metal coating modifies the plastic substrate in that it enhances the appearance, reduces the swelling and distortion on exposure to solvents, increases the tensile and impact strengths, and imparts higher deflection temperatures.

However, only in the last few years has it been possible to produce metal plated shaped plastic articles of sufficient quality at a cost to merit commercialization. Due to the large estimated market and attractive returns for such products, numerous plastic and plating companies have initiated investigations in this area.

As a result of these investigations, processes have now been developed for plating polyacetals, polystyrene, epoxies, polyesters and acrylics but these plated plastic materials have not generally met with commercial acceptance. Until recently, acrylonitrile-butadiene-styrene (ABS) polymers were the only plastics used in quantity for metal plated structural products. Although inexpensive, these polymers are far from ideal engineering plastics, due to their deficiency in modulus and poor thermocycling properties.

The mechanical properties of filled nylon polymers make them particularly well suited for use in the fabrication of metal-plated structural products. These polymers have a higher modulus and much better thermocycling properties than the ABS polymers and therefore should be marketable for external applications, provided that a strongly adherent plate could be applied.

Heretofore, the preparation of metal-plated plastics usually required the following process steps: (1) pretreatment or activation of the surface; (2) sensitization of the surface by deposition of a strongly adsorbed catalytic layer of metal; (3) deposition of a conductive layer via electroless metal plating; and (4) deposition of several layers of one or more metals to yield the final plated product.

Satisfactory performance of any metal plated plastic is dependent upon development of adequate adhesion of the plate to the substrate. Adequate adhesion can be attained by sufficient chemical or mechanical activation of the substrate surface, provided that extensive degradation of the surface does not occur. In the past, such methods as coating, mechanical abrasion, chemical ething and the like have been used to activate the surface of plastic materials and enhance the chemical and/or mechanical bond between the metal and the non-metallic substrate. These methods have required special equipment and long processing times and have thus increased the cost of such pretreatments.

Mechanical abrasion has been reported to activate the surface of nylon substrates and improve their adhesion for metal plates; however, these processes roughen the surface and the resultant plate has a matte or satin finish. Moreover, these procedures are not readily adaptable to an automated plating process and the handling required makes this method relatively expensive. Strong oxidizing agents such as chromic acid, which have been used to etch and/or oxidize a large variety of plastic surfaces to promote adhesion, degrade the surface of nylon and result in the formation of a weak boundary layer. Although nylon products have been metal plated previously, satisfactory adhesion between the plate and the nylon substrate has not yet been attained.

It has now been found that the receptivity and adhesion of nylon surfaces for metal plate or polar organic coatings can be significantly increased through activation of the substrate surface by brief exposures to aqueous solutions of reducing acids such as hydrochloric acid under carefully controlled conditions. The surface activation of nylon produts by the above treatment not only improves the adhesion for the metal plate but also for various polar organic coatings.

The use of various surface treatments to promote the bonding of dissimilar materials to a number of polymer surfaces have been described in numerous patents. Included among these are some patents pertaining to the use of protonic acid solutions to "etch" and pretreat polymer surfaces to promote adhesion. For example, the use of acids or acid halides to etch the surface of nylon fibers is described in U.S. Pats. 2,251,508 and 3,075,823. The strong oxidizing acids generally used for this purpose hydrolyze and degrade nylon surfaces and form weak boundary layers, thus making these surfaces unsatisfactory for metal plating.

A process for the modification of the surface of freshly fabricated polyethylene products by brief exposures to concentrated aqueous solutions of halogens or hydrogen halides is known. Concentrated solutions of hydrogen halides in water will dissolve the surface layers of nylon products, however, and would not yield the smooth, uniformly receptive surface required for satisfactory metal deposition, even after extensive rinsing.

U.S. Pat. 3,377,187 describes the use of dilute solutions of acids or acid salts with a pK <1 to condition the surface and improve the affinity of nylon film for hydrophobic organic top coat materials, such as epoxy coatings. Hydrochloric acid is one of several acids disclosed as being suitable for the practice of that invention. The acid concentrations and exposure times recommended in this patent would not activate the surfaces of high molecular weight filled nylons to an acceptable level for bonding metal plate. Oxidizing acids, which are also disclosed as being suitable for the practice of the invention, would not be satisfactory for imparting the good surface receptivity necessary for metal plating.

SUMMARY OF THE INVENTION

In accordance with this invention, there is provided a process for improving the adhesion characteristics of a polyamide article which comprises treating the surface of the article with an aqueous solution of a reducing acid for a time sufficient to activate the surface and thereafter removing the acid by washing.

Nylon surfaces activated by means of the process of this invention may be plated by the "electroless deposition" method to give products having improved mechanical and thermocycling properties. The term "electroless deposition" as used herein is well known for the plating of a metal on an active, non-conductive surface by chemical means and is disclosed in a number of prior art patents. A publication entitled "Symposium on Electroless Nickel Plating," identified as ASTM Special Technical Publication No. 265, published by the American Society for Testing Materials contains an extensive discussion of the art of electroless plating in addition to the numerous patents pertaining to this subject.

For best results, in carrying out the surface activation treatment of this invention, the non-conducting nylon surface should first be cleaned to insure that surface contamination due to handling and storage is completely removed. Solvents and detergents may be used for this purpose, provided that they are removed after the cleaning treatment. If polar solvents or water are used for cleaning the surface, a drying cycle at elevated temperatures is recommended after completion of the treatment as some polar solvents interact with the amide groups of the nylon to form complexes. If detergents are used, they should be removed by thorough rinsing to avoid deposit formation.

In accordance with this invention, the cleaned nylon surface is immersed in an aqueous solution of a reducing acid, such as hydrochloric acid, for a time sufficient to effect uniform and adequate surface activation (i.e. ionization of the surface amide groups) over substantially the entire exposed surface and the article thereafter removed from the bath, treated to remove the excess acid, e.g. by rinsing with water, and then optionally dried.

Aqueous solutions of reducing acids which may be used in the practice of this invention include those such as, for example, hydrogen chloride, hydrogen bromide, hydrogen iodide, formic acid, glutaric acid, and the like. It is known to "etch" and pretreat polymer surfaces with protonic acid solutions to promote adhesion. However, etching alone does not insure improved adhesion for metal plate. The strong oxidizing acids, such as mineral acids, generally used for this purpose also hydrolyze and degrade the nylon surface and form weak boundary layers. The hydrophilic surfaces thus formed, although having a good physical appearance, are incapable of forming a strongly adherent metal plate. For best results in the practice of this invention, the following requirements should be met for any given aqueous acid solution—nylon surface system. The reagent should be sufficiently strong to rapidly break up the hydrogen bonding between neighboring amide groups on the nylon surface without forming stable compounds. The strength of the reagent should be sufficiently weak and the contact time sufficiently brief to prevent solubilization of the surface layer and interaction with layers of polymer below the surface.

In carrying out this invention, the process conditions used for a specific nylon polymer substrate may vary but should be such that the desired degree of surface activation is attained. By the term "desired degree of surface activation" as used herein is meant a totally activated surface capable of forming metal plated or coated products having improved adhesion and thermocycling properties. The process is essentially a two-step process, the first step consisting of the formation of an ionic compound or complex on the surface of the nylon substrate and the second step consisting of the decomposition of the adduct to produce a highly reactive surface.

In the actual practice of this invention as described in greater detail hereinafter, the conditions of time, temperature, reagent and concentration of reagent used for the surface activation treatment can be varied, and the combination of conditions necessary to give optimum results for a specific sample may be readily determined by those skilled in the arts. Insufficient exposure results in a non-uniform surface treatment and poor adhesion properties; whereas excessive exposure results in diffusion of the reagent into underlying layers giving a soft surface which can be marred too easily for convenient processing and which may undergo enough relaxation to cause stratification of the top layers.

It is of course obvious that the exposure time and bath concentration will depend on the composition as well as the state of the surface of the article being treated, i.e. the accessibility of the amide groups. The accessibility of the amide groups is dependent on the physical parameters of the surface being treated such as orientation, crystallinity, bulk density and smoothness of the surface layers, and by the type and degree of bonding in which the surface amide groups are involved. The conditions of time and concentration must be such that the surface amide groups undergo ionization by the reagent rapidly without excessive diffusion of the reagent into the body of the article taking place, and such that the surface of the article is covered uniformly by ionized amide groups. Thus, the time required to treat a nylon fiber without filler would be much less than the time required to treat a solid article molded from filled nylon in which some of the surface amide groups are involved in bonding the filler. If the filler can be activated by the HCl, then the time required to activate the surface will be reduced. Consequently, for purposes of defining this invention, it can be said that the nylon article is treated for a time sufficient to allow activation (or ionization of the amide groups) over essentially the entire surface area of the article being treated, and insufficient to allow diffusion of the reagent past the outer skin of the article.

The optimum exposure time required for conversion of molded nylon articles to the desired degree of surface activation is generally always less than 10 minutes, and usually less than 5 minutes but will vary depending on the combination of other conditions used, with the time varying inversely with the temperature and concentration of a given acid bath. Generally, for nylon articles of any size, a time of at least about 0.5 minute is required.

Reagent bath temperatures of from a little below ambient to a little above ambient have been found to be satisfactory in most instances; however, higher temperatures may be employed in those cases in which it is desirable to use dilute solutions of reagent or in which the surface to be treated is particularly unreactive.

The permissible concentration range of the aqueous acid solution is mainly dependent on the nature of the acid itself. When hydrogen halides, such as hydrochloric acid are used, dilute solutions such as from about 7 to about 12 percent are preferable in most instances. Concentrated solutions of hydrogen halide in water dissolve the surface layers of nylon products and do not yield a smooth, uniformly receptive surface for metal deposition even after extensive rinsing. When formic acid is used, however, aqueous solutions containing from about 40 to about 60 percent formic acid generally give best results. The concentration of the acid bath may vary over a wide range depending upon the nature of the substrate being treated and the combination of other reaction conditions used, but for best results the concentration should be such that brief exposure of the reagent solution to a given surface results in sufficient ionization of the surface amide groups to result in satisfactory adhesion for metal plate, without having an appreciable effect on the interlayers of the bulk polymer.

In addition to time, temperature and concentration of reagent, the conversion of the substrate surface to the desired degree of surface activation or ionization is also affected by the physical parameters of the surface being treated, such as orientation, crystallinity, bulk density and smoothness of the surface layers. When filled nylon samples are used, the amount and nature of the filler can affect the optimum reaction conditions. Since the critical feature of the present invention is concerned with a surface transformation, it is not surprising that the physical parameters of the surface are particularly significant with respect to the optimum combination of reaction conditions. In general, more stringent conditions are required to effect a given degree of conversion as the bulk density, orientation and crystallinity of the surface layer increases, i.e. longer exposure times and/or higher bath concentrations.

When molded nylon samples are used, the molding conditions and the composition of the mold surface in contact with the cooling melt can affect the optimum reaction conditions. As the resin composition and molding conditions are altered, the accessibility of the amide groups at the surface may change considerably.

In carrying out this invention, the samples should be supported by clamps or other means in the bath in order to provide efficient contact with the reactant. For best results, the samples should be mounted under conditions providing minimum tension as stresses which may develop in the sample as a result of tension will effect the morphology of the sample surface.

In the second step of the process of this invention, the treated sample is removed from the bath and rinsed with running water to remove the acid reagent and produce an activated surface. Incomplete removal of the acid from the nylon surface not only reduces the bonding sites necessary for strong absorption of the palladium catalyst in metal plating, but also leaves a weak boundary layer and a reactive agent which can subsequently degrade the substrate. Water rinsing must be sufficiently thorough to completely remove the acid but not excessive in order to minimize the diffusion of water into the inner layers of the substrate. Although tap water may be used satisfactorily for this purpose, it is recommended that deionized water be used, if available, in order to avoid the possible adverse effect of contaminants in the water.

In most instances, a one-half to two minute exposure to a turbulent flow of water at ambient temperature is sufficient to provide a receptive surface. In general, it has been found that the temperature of the wash water should be greater than 20° C. for effective washing. Water wettability of the sample surface is not a satisfactory monitor of the level of surface activation when the treatment described hereinabove is used. The optimum rinse time required to remove the reagent will vary with the water temperature and flow patterns, as well as the extent of reagent diffusion into the substrate. In any event, the optimum conditions for washing may be readily determined. Excessive washing, particularly at higher temperatures, should be avoided as the substrate may pick up water, which can interfere with the bonding or result in unnecessary stress in thermo-cycling or in a decrease in the surface activity.

After washing, the surface active wet nylon sample may be used directly for plating, or it may be dried, stored and used at a later time. However, it is important that (1) removal of the acid is complete and (2) the activated surface does not pick up excessive water prior to coating. Drying can be accomplished by any suitable means such as oven or hot air drying, infrared drying, dielectric heating or the like. Excessive heating temperatures or times should be avoided for best results. Nylon surfaces which have been treated and dried as described above, will remain active for periods of several days; however, long time lapses between treatment and use should be avoided, particularly in humid atmospheres, as the surface activity does decrease on storage.

Although the exact nature or the extent of the reactions taking place on the nylon surface is not completely understood, it is known, as shown hereinafter, that articles treated in accordance with the present invention show excellent adhesion properties. While not wishing to be bound to any specific theory of operation, the following discussion is believed to present a reasonable explanation of the reactions which occur during the process of this invention.

Donor molecules having functional groups such as amides or nitriles are known to react with Lewis acids, to form complexes or addition compounds with widely varying stabilities, depending on the relative strengths of the reagents and the stearic hinderance of neighboring groups. These complexes range from the fleeting "contact complex" to the "charge transfer complex" to the relatively stable "coordination complex" to compounds having ionic structures.

The amide groups of nylon are amphoteric and show acidic or basic character, depending on the pH of the surrounding medium. In aqueous solutions of strong protonic acids, the acid will react first to ionize any free amine end groups at the surface of the nylon product as shown below:

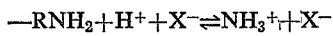

In solutions having a pH less than 1.7, the protonic acid will interrupt the hydrogen bonding between neighboring amide groups and ionize the amide as shown below:

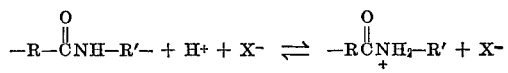

Subsequent rinsing with water reverses the reaction and removes the acid leaving the surface in an active or meta stable state with donor amide groups having electrons to share. Zero valent noble metals such as palladium, which have vacant inner orbitals, are acceptors for such electrons and can be chemisorbed and bonded to the polymer surface. Palladium, bonded at the surface, acts as a catalyst for electroless deposition of copper or nickel.

Organic polymers having electron acceptor groups can also be bonded in similar manner to the activated surface of the nylon article, provided that the coating vehicle does not compete for the activated site.

An abundance of information has been accumulated about the interactions between electron acceptors and donors which are known to result in the formation of molecular complexes or addition compounds. A classification of donors and acceptors and their interactions is found in papers by R. S. Mulliken in the Journal of the American Chemical Society, vol. 56, No. 7, pp. 801–802 and vol. 74, pp. 811–819.

Changes obtained in the wettability of the polymer surface by the ionization treatment of this invention correlates very well with the above described mechanism. Before the ionization treatment, the polymer surface is not water wettable. Water wetting of the acid treated surface supports the probable protonation of the surface amide groups. Wettability of the thoroughly water rinsed article shows that the surface is at a higher energy level after the treatment than that found for the original article. After removal of the water by drying, the surface, although still active, is somewhat less wettable than the freshly treated and water rinsed sample.

The degree of ionization (on surface activation) of an acid treated nylon plaque may be indicated by the adsorption of an acid dye such as Scarlet 4RA. Untreated plaques do not pick up significant amounts of the dye even after a two-hours immersion in the dye solution. After treating for 0.5 minute with 3 N HCl, the plaque absorbed appreciable dye in 30 seconds. The uniformity and intensity of the dyed plaque increased as the time of acid treatment was increased to five minutes. Nylon plaques which had been treated with 3 N HCl for five minutes were stored at room conditions and dyed after various time lapses. Acid dye pickup was found to decrease with increased lapse time.

The prior art methods for the provision of metal coatings on non-conductive substrates usually comprise the steps of (1) surface activation by mechanical abrasion or chemical etching, (2) sensitization of the surface by deposition of a catalyst for the electroless plating reaction, (3) deposition of a conductive layer of metal by electroless plating, and (4) electroplating the conductive surface. The present invention provides an alternative method for carrying out step 1 on nylon having improved adhesion properties. The surface activity of the substrate is greatly enhanced without appreciable deterioration of the surface by the present process; whereas, surface activation of nylon substrates by either mechanical abrasion or chemical etching is accomplished by considerable degradation of the surface layers. Although some etching may occur in the practice of this invention, the conditions employed are such that this phenomena is restricted to essentially the surface layers; whereas chemical etching as generally practiced extends to the inner layers of the bulk polymer, and results in rather large pits being formed. In other words, the treatment of this invention etches the surface on a microscale and probably relieves surface stresses.

Products prepared by the process of this invention may be metal plated by the conventional procedures described in the art for carrying out steps 2, 3 and 4 above. Such processes and compositions useful therefor are well known and in substantial commercial use, and thus will not be described in detail herein. It should be noted that when the surface active products of this invention are used in metal plating processes, the rates, extents of deposition and quality of the products obtained are at least comparable to those of other surface active products. Commercially available solutions, prepared for use in the electroless plating process may be used for further processing the products of this invention.

The process of this invention may be applied to either pure nylon substrates, or to nylon substrates containing up to 60% of a mineral filler. For most commercial applications, the use of filled nylons are preferable due to their improved mechanical and thermocycling properties.

Plated nylon plaques, prepared by the process of this invention were evaluated on the basis of (1) general appearance, (2) force to peel one-inch wide strip of the plate from the plaque at an angle of approximately 90° from the surface of the plaque, (3) resistance to thermocycling, i.e. 5–10 one-hour cycles between 100° C. and −20° C., and (4) resistance to five-day exposure to water at 160° F.

In the treatment of plaques prepared from the same filled nylon polymer sample, it was found that a five-minute treatment was not only more uniform but appeared to show less well-defined features than a one-minute treatment. Plaques activated by a five-minute treatment resulted in a more uniform metal platted product than plaques exposed for only one-half minute; however, the peel strengths of the metal plates were similar. A treatment of ten minutes resulted in plated plaques having lower peel strength than those exposed for shorter periods.

Observation of the peel failures in these metal plated plastics showed that samples activated to an adequate level (shorter exposure) usually resulted in plastic failures, whereas those activated at intermediate exposure times failed between the electroless plate and the catalyst, and those which were over-exposed failed in both areas and at lower forces. Thus, the use of a dye test and peel strength measurements may be useful tools for determining the optimum set of treatment conditions for a given nylon sample.

Illustrative examples of the surface activation of nylon substrates according to the process of this invention are given below. While the invention is particularly illustrated and described by these examples with reference to the preferred embodiments thereof, it will be understood by those skilled in the art that variations may be made therein without departing from the spirit and scope of the invention.

EXAMPLE I

This example illustrates the general procedure used for the surface activation and plating of filled nylon plaques, in this case, filled nylon sold under the trade name Vykan A, a product of Monsanto Company, using an aqueous hydrochloric acid solution.

(A) Surface activation

Aqueous hydrochloric acid solutions were prepared to the desired concentration by dilution of commercial grade concentrated HCl. A 3 N solution at room temperature was found to be sufficiently concentrated to activate the surface of articles from Vykan A, without the excessive swelling found at higher acid concentrations. Filled nylon plaques were immersed in the solution for the desired length of time, usually for one to five minutes. Some morphological changes of the surface occur during activation. After removal from the bath the plaques were rinsed for one-half to one minute under a turbulent flow of deionized water at 20° to 30° C. The sample was then air dried at room or elevated temperatures, or used directly without drying.

(B) Plating mineral filled nylon products

The activated Vykan A plaques were plated using commercial plating chemicals and procedures. In these examples, prior art methods, i.e. using known catalysts, were employed and electroless nickel solutions were used in depositing a thin conductive metal coating. Thorough water rinses are required between each of the steps used to produce the conductive layer. The rinse periods are kept to a minimum (1–3 minutes) and the product should not be immersed in water for extended periods. The electroless plate is generally limited to a layer thick enough to give a good conductive coating (0.05 mil). The electroless coated plaques were subsequently electroplated using the procedures described in the individual examples.

EXAMPLE II

This example illustrates the effect of pretreatment conditions on the plating properties of filled nylon products. The process described in Example I was repeated using 3 N HCl to surface activate Vykan A plaques varying in filler content.

The surface activated plaques were plated by immersing in (a) a Marbon (Marbon Chemical Co., MacDermid Inc., and Udylite Co. are all well known suppliers of electroplating catalysts, activators, solutions, etc.) A–30 catalyst solution at room temperature for five minutes, (b) a Marbon D–25 catalyst activator solution for five minutes and a Marbon Electroless Nickel plating solution for five minutes. Between each step of the process the plaque was rinsed thoroughly for one minute in flowing deionized water. These plaques were then electroplated in Watts Nickel solution for 30 minutes at 45 a.s.f. The results are shown in Table I.

EXAMPLE III

This example illustrates the fact that adequate rinsing to remove the acid reagent is necessary to obtain good adhesion of metal plate and a uniform metal plate. During excessive water exposures the substrate may pick up water which can interfere with bonding or result in unnecessary stress in thermocycling.

Plaques of Vykan A were surface activated by exposure to 3 N HCl for five minutes and subsequently water rinsed as described in Table II. The plaques were then plated as described in Example II.

EXAMPLE IV

This example gives a comparison of the adhesion of Ni to Vykan A plaques etched with 3 N HCl for various time intervals and then subjected to various conditions. The plaques were extracted with ethyl formate, placed in the oven at 100° C. for two hours, cooled and subsequently treated with 97% HCl solution and then rinsed and plated using Marbon catalyst, accelerator, and electroless nickel, and Watts type low chloride electroplate nickel. The results are given in Table III.

EXAMPLE V

This example illustrates the effect of the pretreatment process of this invention on the adhesion of various paints to nylon plaques. Test panels of Vykan A (4 x 12 x 0.25 in.) were prepared by molding without the use of a mold release agent for this evaluation. The following pretreatments were applied to the samples.

(A) No treatment,
(B) 3 N HCl—1 min. dip—10 sec. rinse,
(C) 3 N HCl—1 min. dip—20 sec. rinse.

In order to evaluate the effectiveness of these pretreatments with regard to surface cleaning, a small area of each test panel was soiled deliberately by placing a heavy finger print on an identical spot on each test panel. Paint systems used in the test and their corresponding baking cycles were as follows:

(1) Ford M32J exterior black enamel. Bake 17 min. at 265° F.
(2) Chrysler PA-10-1 exterior white enamel. Bake 30 min. at 250° F.
(3) Ford M2J-200 AA interior black enamel. Bake 30 min. at 250° F.
(4) Chrysler MS-PP 6-1 interior black enamel. Bake 30 min. at 250° F.

Excellent paint adhesions were obtained on test panels that had been pretreated with the HCl etching process. These adhesions were retained even after exposure to moisture at 90 to 100° F. A significant increase in coating hardness was observed for most of the pretreated panels. A reduction in gloss, relative to the untreated panels was noted, however.

A comparison of the adhesion and hardness values for the various paints is given in Table IV. It can be seen that with respect to polar organic coatings such as paints, the adhesion can be significantly improved by the pretreatment with the aqueous HCl reagent.

Pencil hardness, referred to in Table IV, is described in Testing of Polymers, by John V. Schmitz, vol. 2, pp. 254–55, Interscience Publishers (1966).

Paint adhesion was evaluated by ratings on blistering and tape pull failures, using 3M masking tape No. 710. Ratings were made before and after intermittent exposures to water at 90° F. and condensing humidity at 100° F. Coatings which did not blister and were not removed with the tape were rated good and coatings showing blisters or tape failures were rated unsatisfactory.

EXAMPLE VI

This example illustrates the effect of the treatment of Vykan A plaques with aqueous solutions of HCl and other protonic acids. The acids used are listed below in descending order of effectiveness based on plating characteristics and/or peel strength of the plated plaques.

| Acid: | Concentration (by weight), percent |
|---|---|
| HCl | 5–15 |
| $HCO_2H$ | 50–55 |
| $H_3PO_4$ | 20–85 |
| $H_2SO_4$ | 12–50 |
| $F_3C$-$CHOHCH_3$ | 5–10 |
| $H_2SO_4 \cdot CrO_3$ | 12 $H_2SO_4$–3 $CrO_3$ |
| $H_2Cr_2O_7$ | 10–40 |
| $HNO_3$ | 5–12 |

Of the above, only the exposures to 3 N HCl and the 50–55% formic acid solutions activated the Vykan A surfaces sufficiently to yield plated plaques with good properties. In general, as the acid content for a given acid was increased, the wettability was increased but the Vykan A surface was softened and tended to go into solution. Solutions strongh enough to activate the surface sufficiently for bonding also resulted in etching to various degrees. However, etching alone did not insure improved adhesion for metal plate.

The mineral acids which are also oxidizing agents (e.g. $H_2Cr_2O_4$, etc.) produce hydrophilic surfaces with good physical appearances. However, the electroless nickel was deposited irregularly or not at all under the variations of etchant concentrations, exposure times, sensitization treatments, etc., tried. In general, the surface was degraded by these treatments.

TABLE I

| Resin | Exposure time to 3 N HCl (min.) | Water rinse Temp. (° C.) | Water rinse Time (min.) | Adhesion tests, peel strength (lbs./in.) After 2 hrs., 100° C., +5 days R. T. | Adhesion tests, peel strength (lbs./in.) After 10 thermocycles, +100 −20° |
|---|---|---|---|---|---|
| Vykan A | 1 | 20–30 | 2 | 5.8–6.6 | 5.8–6.1 |
| Do | 2 | 20–30 | 2 | 5.6–6.1 | 5.8 |
| Do | 3 | 20–30 | 2 | 5.2–6.0 | 5.6 |
| Do | 4 | 20–30 | 2 | 4.4–5.6 | 3.4–5.2 |
| Do | 5 | 20–30 | 2 | 5.0 | 4.6–5.2 |

TABLE II

| Run number | Water rinse conditions, temp./time/agitation (° C./min./—) | Appearance of plaque after catalyst* | Appearance of metal plate | Adhesion tests peel strength (lbs./in.) |
|---|---|---|---|---|
| 1 | 5°/0.5/moderate flow | Color irregular, very light tan | Slightly irregular blisters after heating | |
| 2 | 30°/0.5/agitated | Light tan, color slightly irregular | Uniform | 2.8 to 4. |
| 3 | 30°/1/agitated | Medium tan, slightly irregular | do | 5.0 to 5.8. |
| 4 | 30°/2/agitated | Medium tan, uniform | do | 5.0 to 6.0. |
| 5 | 30°/30/moderate flow | do | Blisters after heating | <1.0 variable. |

*Increase in color indicates increase in catalyst pick-up.

TABLE III

Peel strengths (lb./in.)

| | 3 N HCl exposure time (min.) | | | | | | | | |
|---|---|---|---|---|---|---|---|---|---|
| | 0.5 | 1 | 2 | 3 | 4 | 5 | 6 | 7 | 10 |
| 1. 2 hr. annealing 100° C. plus 1 wk. storage at room temperature | 4.4–5.1 | 4.1–4.6 | 3.8–4.8 | 3.0–5.2 | 2.7–4.5 | 3.5–4.0 | 4.0–4.2 | 3.8–4.4 | 2.2–2.5 |
| 2. 2 hr. annealing 100° C. plus 1 wk. storage at room tempearature plus 5 cycles 100° C. to −20° C | 4.5–5.5 | 3.1–4.6 | 3.8–4.6 | 2.7–4.1 | 3.6–4.8 | 3.8–4.4 | 3.6–4.1 | 4.0–4.3 | 2.2–2.5 |
| 3. Plaques from (2) partially peeled. Immerse in water at 160° F. for 5 days | 3.1–4.0 | 3.4–4.2 | 4.0–4.9 | 2.7–4.0 | 3.1–3.2 | 4.0–5.0 | 3.2–4.8 | 2.8–3.2 | |
| 4. 2 hr. annealing 100° C. plus 1 wk. storage at room temperature plus 5 day immersion in $H_2O$ at 160° F. (encapsulated plaque) | 4.5–5.6 | 4.2–4.6 | 2.7–5.6 | 4.7–5.1 | 4.5–5.0 | 4.4–5.0 | 4.1–4.6 | | |
| 5. Plaques from (4) plus 5 cycles 100° C. to −20° | 4.7–5.5 | 4.7–5.0 | 2.7–5.2 | 4.6–5.2 | 4.2–5.2 | 4.7–5.4 | 4.1–4.9 | | |

TABLE IV

| Pretreatment: | | Paint Adhesion | Pencil hardness |
|---|---|---|---|
| A | 1 | Unsatisfactory | F |
|   | 2 | do | H |
|   | 3 | Good | B |
|   | 4 | Unsatisfactory | HB |
| B | 1 | Good | 2H |
|   | 2 | do | 3H |
|   | 3 | do | B |
|   | 4 | do | H |
| C | 1 | Good | H |
|   | 2 | do | 3H |
|   | 3 | do | B |
|   | 4 | do | H |

What is claimed is:

1. A process for activating the surface of a polyamide article which comprises immersing the article in a weak aqueous solution of a reducing acid for a time sufficient to activate the entire surface of said article and insufficient to allow substantial diffusion of the acid through the outer skin of the article, and thereafter washing the article with water to remove any remaining acid and thereafter plating the article with a metal.

2. A process according to claim 1 wherein the solution has a pH of less than 1.7.

3. A process according to claim 1 wherein the article is immersed in the solution for from about 0.5 to 10 minutes.

4. A process according to claim 3 wherein the article is immersed for less than 5 minutes.

5. A process according to claim 1 wherein the acid is HCl.

6. A process according to claim 5 wherein the acid concentration is between 5 and 15% by weight.

References Cited

UNITED STATES PATENTS

| 3,337,187 | 4/1968 | Macfarland et al. | 117—47 |
| 2,251,508 | 8/1941 | Watson | 117—138.8 |
| 3,235,426 | 2/1966 | Bruner | 117—47 X |
| 2,889,611 | 6/1959 | Bedell | 117—138.8 |
| 3,012,905 | 12/1961 | Tillisch | 117—138.8 X |

FOREIGN PATENTS

| 568,092 | 3/1945 | Great Britain | 8—Dig. 21 (Nylon) |
| 734,493 | 8/1955 | Great Britain | 8—Dig. 21 (Nylon) |

WILLIAM D. MARTIN, Primary Examiner

S. L. CHILDS, Assistant Examiner

U.S. Cl. X.R.

117—138.8 N; 204—38 E